United States Patent
Kamada et al.

(10) Patent No.: US 11,084,264 B2
(45) Date of Patent: Aug. 10, 2021

(54) SURFACE PROTECTIVE FILM LAMINATE, SURFACE PROTECTIVE FILM AND PRODUCING METHOD THEREOF

(71) Applicants: BANDO CHEMICAL INDUSTRIES, LTD., Hyogo (JP); WACOM CO., LTD., Saitama (JP)

(72) Inventors: Yutaka Kamada, Hyogo (JP); Arata Tani, Hyogo (JP); Toshihiko Horie, Saitama (JP); Soh Kato, Saitama (JP)

(73) Assignees: BANDO CHEMICAL INDUSTRIES, LTD., Hyogo (JP); WACOM CO., LTD., Saitama (JP)

( * ) Notice: Subject to any disclaimer, the term of this patent is extended or adjusted under 35 U.S.C. 154(b) by 69 days.

(21) Appl. No.: 15/779,849

(22) PCT Filed: Nov. 14, 2016

(86) PCT No.: PCT/JP2016/083652
§ 371 (c)(1),
(2) Date: May 30, 2018

(87) PCT Pub. No.: WO2017/094480
PCT Pub. Date: Jun. 8, 2017

(65) Prior Publication Data
US 2018/0345639 A1    Dec. 6, 2018

(30) Foreign Application Priority Data
Nov. 30, 2015   (JP) .............................. JP2015-232573

(51) Int. Cl.
*B32B 27/40*    (2006.01)
*B32B 27/00*    (2006.01)
(Continued)

(52) U.S. Cl.
CPC ............. *B32B 27/40* (2013.01); *B32B 7/12* (2013.01); *B32B 27/00* (2013.01); *B32B 27/26* (2013.01);
(Continued)

(58) Field of Classification Search
None
See application file for complete search history.

(56) References Cited

U.S. PATENT DOCUMENTS

| | | | | |
|---|---|---|---|---|
| 2011/0111217 | A1* | 5/2011 | Kuroda | .................... C09J 7/38 428/339 |
| 2012/0202055 | A1* | 8/2012 | Kataoka | .................... C09J 9/02 428/336 |

FOREIGN PATENT DOCUMENTS

| JP | H06016851 | | 1/1994 | |
|---|---|---|---|---|
| JP | JH0616851 | * | 1/1994 | ............ B32B 27/08 |

(Continued)

OTHER PUBLICATIONS

Nakamura—JP H06-16851—ISR D#4—MT—film w-embossing—1994 (Year: 1994).*

(Continued)

*Primary Examiner* — Callie E Shosho
*Assistant Examiner* — John Vincent Lawler
(74) *Attorney, Agent, or Firm* — JCIPRNET (57) ABSTRACT

The present invention addresses the problem of providing a surface protective film laminate, surface protective film and its producing method. The surface protective film which has excellent smoothness, light transmission properties, transparency, scratch resistance, weather resistance and self-healing properties. The present invention provides, as a solution, a surface protective film wherein three layers, namely, a protective layer, a transparent base film and a pressure-sensitive adhesive layer are laminated in this order, (Continued)

said protective layer being formed of a thermosetting polyurethane which is a cured product of a polyether polyol, an aliphatic isocyanate, an alcohol-based curing agent and a non-amine catalyst.

6 Claims, 2 Drawing Sheets

(51) Int. Cl.
  *C08G 18/24* (2006.01)
  *C09J 7/40* (2018.01)
  *C09D 175/04* (2006.01)
  *C08G 18/75* (2006.01)
  *C08G 18/48* (2006.01)
  *C09J 7/20* (2018.01)
  *B32B 7/12* (2006.01)
  *B32B 27/26* (2006.01)
  *B32B 27/28* (2006.01)

(52) U.S. Cl.
  CPC .......... *B32B 27/285* (2013.01); *C08G 18/242* (2013.01); *C08G 18/244* (2013.01); *C08G 18/246* (2013.01); *C08G 18/4854* (2013.01); *C08G 18/758* (2013.01); *C09D 175/04* (2013.01); *C09J 7/20* (2018.01); *C09J 7/40* (2018.01); *C09J 2475/005* (2013.01)

(56) References Cited

FOREIGN PATENT DOCUMENTS

| | | |
|---|---|---|
| JP | 2008114387 | 5/2008 |
| JP | 2008275720 | 11/2008 |
| JP | 2011236335 | 11/2011 |
| JP | 2012196868 | 10/2012 |
| JP | 2012221682 | 11/2012 |
| JP | 2013027998 | 2/2013 |
| WO | 2014141866 | 9/2014 |

OTHER PUBLICATIONS

Iwanaga—JP 2008-275720 A—MT—ISR D#1—2008 (Year: 2008).*
Nishioka—JP 2008-114387 A—ISR D#3—MT—roller apparatus for making films—2008 (Year: 2008).*
Higuchi—JP 2011-236335 A—ISR D#2—MT—heat-curable polyurethane—2011 (Year: 2011).*
"International Preliminary Report on Patentability; this report contains the following items: Form PCT/IB/338, Form PCT/IB/373, PCT/ISA237(cover sheet), PCT/ISA237(Box No. I), PCT/ISA237(Box No. V), and Form PCT/IB/326," dated Jun. 14, 2018, which is English translation of "Written Opinion of the International Searching Authority", pp. 1-16.
"International Search Report (Form PCT/ISA/210) of PCT/JP2016/083652," dated Dec. 20, 2016, with English translation thereof, pp. 1-4.

* cited by examiner

SURFACE PROTECTIVE FILM LAMINATE, SURFACE PROTECTIVE FILM AND PRODUCING METHOD THEREOF

CROSS-REFERENCE TO RELATED APPLICATION

This application is a 371 application of the International PCT application serial no. PCT/JP2016/083652, filed on Nov. 14, 2016, which claims the priority benefit of Japan Patent Application No. 2015-232573, filed on Nov. 30, 2015. The entirety of each of the above-mentioned patent applications is hereby incorporated by reference herein and made a part of this specification.

TECHNICAL FIELD

The present invention relates to a surface protective film for protecting a transparent substrate on a display surface.

BACKGROUND ART

In portable electronic devices such as a smartphone, a tablet PC, and a music player, a surface protective film can be laminated thereon in order to protect a transparent substrate on a display surface. Light transmission properties, transparency, scratch resistance, and weather resistance are necessary for the surface protective film. In addition, in recent years, portable electronic devices have been generally operated through electrostatic capacitance type touch panels and antifouling properties for preventing fingerprints and sebum from remaining thereon, allowing a feeling of writing with a touch pen and sliding properties thereof, and self-healing properties for restoring a film pushed by a tip of a touch pen to its original state over time have been newly required.

As a surface protective film, for example, in Patent Literature 1, a protective film having a soft resin layer made of a urethane (meth)acrylate and a fluorine-containing compound and/or a compound having a siloxane bond on one surface of a transparent substrate film has been proposed. In Patent Literature 1, it is described that the thickness of the soft resin layer is preferably 5 to 200 µm, and the soft resin layer is formed when coating is performed by a wet film formation method to form a coating, the coating is dried and ultraviolet light is then emitted. Since the soft resin layer in Patent Literature 1 contains a fluorine-containing compound and/or a compound having a siloxane bond which is a low surface tension component, the low surface tension component remains separated until the coating is dried, cloudiness tends to occur, and it is difficult to form a uniform transparent coating. In addition, in the wet film formation method, it is very difficult to form a coating with a thickness of 30 µm or more while maintaining optical characteristics at a level required for a surface protective film.

In Patent Literature 2, an invention of a self-healing laminate including a substrate film and a self-healing resin layer is proposed. In Patent Literature 2, it is described that the thickness of the self-healing resin layer is preferably in a range of 10 µm to 60 µm, a thermosetting polyurethane obtained from a polyol including a polycaprolactone and a polyisocyanate is preferable as a resin used to form the self-healing resin layer, and a component for the self-healing resin layer is continuously applied to the substrate film, as necessary, drying is performed, and curing is then performed by heating to form a self-healing resin layer. However, a polyurethane including a polycaprolactone polyol has better hydrolyzability than other ester-based polyols, but it has lower hydrolyzability than ether-based polyols. In addition, as in Patent Literature 1, it is very difficult to form a coating with a thickness of 30 µm or more while maintaining optical characteristics at a level required for a surface protective film.

CITATION LIST

Patent Literature

[Patent Literature 1]
  Japanese Unexamined Patent Application Publication No. 2012-196868
[Patent Literature 2]
  Japanese Unexamined Patent Application Publication No. 2013-27998

SUMMARY OF INVENTION

Technical Problem

An objective of the present invention is to provide a surface protective film having excellent smoothness, light transmission properties, transparency, scratch resistance, weather resistance, and self-healing properties.

Solution to Problem

In order to address the above problems, forms of the present invention are as follows.

1. A surface protective film in which three layers including a protective layer made of a thermosetting polyurethane which is a cured product of a polyether polyol, an aliphatic isocyanate, an alcohol-based curing agent, and a non-amine catalyst, a transparent substrate film, and a pressure-sensitive adhesive layer, are laminated in that order.
2. The surface protective film according to 1, wherein the protective layer has a thickness of 100 µm or more and 300 µm or less.
3. The surface protective film according to 1 or 2, wherein the alcohol-based curing agent is a mixture of 50 parts by weight or more and 100 parts by weight or less of a dihydric alcohol and 50 parts by weight or less and 0 parts by weight or more of a trihydric alcohol.
4. The surface protective film according to any one of 1 to 3, wherein a haze value is 0.1% or more and 40% or less.
5. A surface protective film laminate in which a mold release film is laminated on a surface on the side of the protective layer of the surface protective film according to any one of 1 to 4 and a release film is laminated on a surface on the side of the pressure-sensitive adhesive layer.
6. A method of producing a surface protective film including:
  laminating three layers including a protective layer made of a thermosetting polyurethane obtained by curing a polyether polyol, an aliphatic isocyanate, and an alcohol-based curing agent in the presence of a non-amine catalyst, a transparent substrate film, and a pressure-sensitive adhesive layer in that order;
  sending a material component containing a polyether polyol, an aliphatic isocyanate, an alcohol-based curing agent, and a non-amine catalyst to a gap between first and second gap maintaining members that are conveyed by a pair of rollers which are disposed apart from each other;

thermally curing the material component that is held between the first and second gap maintaining members to form the protective layer; and forming one of the first and second gap maintaining members as the transparent substrate film.

7. The method of producing a surface protective film according to 6, wherein one of the first and second gap maintaining members is a film that is not subjected to a mold release treatment and the other is a film that is subjected to a mold release treatment.

8. The method of producing a surface protective film according to 6 or 7, wherein the other of the first and second gap maintaining members is a film having irregularities and the material component is held on a surface having the irregularities.

Advantageous Effects of Invention

The surface protective film of the present invention has excellent light transmission properties, transparency, scratch resistance, weather resistance, and self-healing properties due to use of a protective layer made of a specific polyurethane. In addition, when irregularities are formed on the outermost surface of the protective layer, it is possible to impart anti-glare properties. When 50 parts by weight or more and 100 parts by weight or less of a dihydric alcohol and 50 parts by weight or less and 0 parts by weight or more of a trihydric alcohol are used as an alcohol-based curing agent, it is possible to further increase the mechanical strength.

The surface protective film of the present invention has suitable optical characteristics for a surface protective film even though the protective layer has a thickness of 100 μm or more and 300 μm or less, and when the thickness is 100 μm or more and 300 μm or less, a feeling of writing and sliding properties of a touch pen are very good, and a feeling of writing equivalent to that on paper is obtained.

In a surface protective film laminate in which a mold release film and a release film are laminated on the surface protective film of the present invention, a protective layer and a pressure-sensitive adhesive layer are protected, and handling properties are excellent.

According to a producing method of the present invention, it is possible to continuously produce surface protective films. In addition, in a wet coating method, a protective layer having a thickness of 100 μm or more and 300 μm or less, which is not easily produced, can be produced without optical characteristics deteriorating. In addition, according to a transfer method, it is possible to easily form irregularities on a surface of the protective layer.

REFERENCE SIGNS LIST

1 Protective layer
2 Transparent substrate film
3 Pressure-sensitive adhesive layer
4 Mold release film
5 Release film
10 Surface protective film
20 Transparent substrate
30 Surface protective film laminate
40 Sheet-like article
40a Material component
41 Casting machine
41a Head part
42a First gap maintaining member
42b Second gap maintaining member
43a Transport roller
43b Transport roller
44 Transport roller
45 Auxiliary roller
46 Heating device
47 Conveyer belt

DESCRIPTION OF EMBODIMENTS

Figure 1:
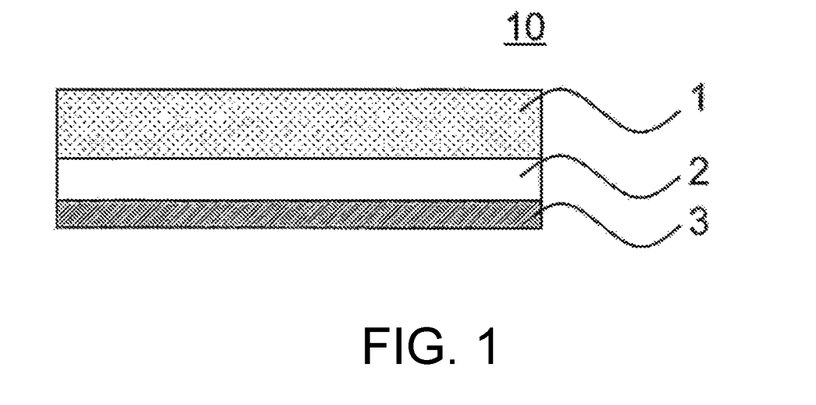
FIG. 1 is a diagram showing a surface protective film.

FIG. 1 shows a surface protective film of the present invention.

A surface protective film 10 of the present invention is a laminate in which three layers including a protective layer 1 made of a thermosetting polyurethane which is a cured product of a polyether polyol, an aliphatic isocyanate, an alcohol-based curing agent, and a non-amine catalyst, a transparent substrate film 2, and a pressure-sensitive adhesive layer 3, are laminated in that order.

Figure 2:
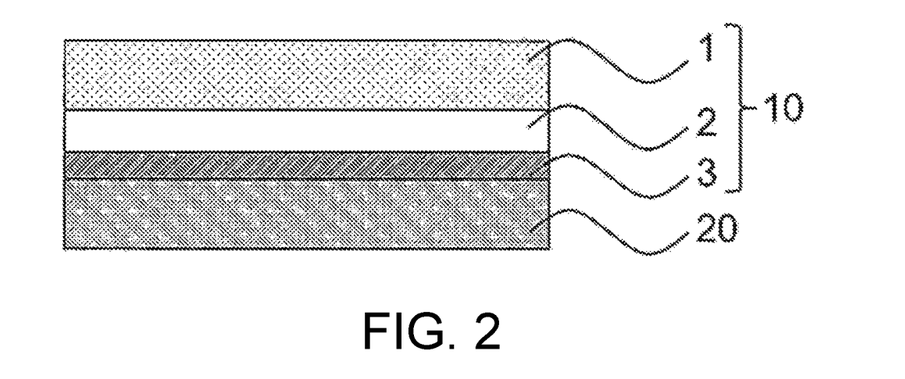
FIG. 2 is a diagram showing a surface protective film attached to a transparent substrate on a display surface.

As shown in FIG. 2, the pressure-sensitive adhesive layer 3 is laminated on a transparent substrate 20 that is positioned on the outermost surface of a display, and the surface protective film 10 of the present invention is used to prevent scratches, cracks, contamination, and the like on the transparent substrate 20. Here, in FIG. 1 and FIG. 2, the thicknesses of the layers do not reflect actual thicknesses.

"Protective Layer 1"

The protective layer 1 of the present invention is made of a thermosetting polyurethane which is a cured product of a polyether polyol, an aliphatic isocyanate, an alcohol-based curing agent, and a non-amine catalyst. When such a specific thermosetting polyurethane is used, transparency and light transmission properties are excellent and scratch resistance, weather resistance, and self-healing properties are excellent.

a. Polyether Polyol

In the thermosetting polyurethane used to form the protective layer 1 of the present invention, a polyether polyol is used as a polyol component. The thermosetting polyurethane obtained from the polyether polyol has excellent hydrolysis resistance, flexibility, and anti-microbial degradability and has low permanent distortion.

As the polyether polyol, for example, a polyalkylene glycol such as polyethylene glycol, polypropylene glycol, polypropylene triol, polytetramethylene glycol, polypropylene tetraol, polytetramethylene triol, and copolymers thereof, and derivatives and modified products in which either or both of a side chain and a branched structure are introduced thereinto, may be exemplified. These can be used alone or two or more types thereof can be used in combination. Among them, polytetramethylene glycol is preferable in consideration of mechanical properties.

The number average molecular weight of the polyether polyol is preferably 200 or more and 10,000 or less, more preferably 500 or more and 5,000 or less, and most preferably 800 or more and 3,000 or less. When the number average molecular weight is less than 200, a reaction occurs too fast, handling properties deteriorate, and a molded article loses flexibility and becomes brittle in some cases. On the other hand, when the number average molecular weight is greater than 10,000, the viscosity becomes too high, handling properties deteriorate, and a molded article crystallizes and becomes opaque in some cases. Here, in the present invention, the number average molecular weight refers to a molecular weight that is calculated from a hydroxyl value of a polyol measured according to JIS-K1557. However, values beyond the above numerical value range are not excluded as long as they are within the spirit and scope of the present invention.

b. Aliphatic Isocyanate

In the thermosetting polyurethane used to form the protective layer 1 of the present invention, as an isocyanate component, an aliphatic isocyanate having no aromatic ring and having two or more isocyanate groups in a molecule is used. The thermosetting polyurethane obtained from an aliphatic isocyanate is unlikely to yellow and can prevent the thermosetting polyurethane from discoloring due to light and heat from a light source, sunlight, and the like and prevent transparency from deteriorating.

As the aliphatic isocyanate, for example, hexamethylene diisocyanate, hydrogenated tolylene diisocyanate, hydrogenated diphenylmethane diisocyanate, isophorone diisocyanate, lysine diisocyanate, isopropylidene bis(4-cyclohexyl isocyanate), norbornane diisocyanate, and modified products and polymers thereof, may be exemplified. These can be used alone or two or more types thereof can be used in combination. Among them, hydrogenated diphenylmethane diisocyanate is preferable in consideration of mechanical properties.

c. Alcohol-Based Curing Agent

In the thermosetting polyurethane used to form the protective layer 1 of the present invention, an alcohol-based curing agent is used as a curing agent. The alcohol-based curing agent has a weaker adverse effect on human bodies and environments than an amine-based curing agent.

The alcohol-based curing agent can be used without particular limitation as long as it has two or more hydroxy groups in a molecule. For example, dihydric alcohols such as ethylene glycol, 1,3-propanediol, 2-methyl-1,3-propanediol, 1,3-butanediol, 1,4-butanediol, 1,5-pentanediol, neopentyl glycol (2,2-dimethyl-1,3-propanediol), 1,6-hexanediol, polyethylene glycol, polypropylene glycol, polybutylene glycol, cyclohexane dimethanol, and a hydrogenated bisphenol A, trihydric alcohols such as glycerin, trimethylolpropane, butanetriol, pentanetriol, hexanetriol, cyclopentanetriol, and cyclohexanetriol, and trivalent or higher alcohols such as pentaerythritol, dipentaerythritol, and tetramethylolpropane may be exemplified. Among them, preferably, a dihydric alcohol is used alone or a combination of a dihydric alcohol and a trihydric alcohol is used. When an amount of the trihydric alcohol is large, the strength of the obtained thermosetting polyurethane is lowered. Therefore, with respect to the total amount of the alcohol-based curing agent, a range of 50 parts by weight or more and 100 parts by weight or less of a dihydric alcohol and a range of 50 parts by weight or less and 0 parts by weight or more of a trihydric alcohol are preferably used, and a range of 60 parts by weight or more and 80 parts by weight or less of a dihydric alcohol and a range of 40 parts by weight or less and 20 parts by weight or more of a trihydric alcohol are more preferably used. In consideration of handling properties and mechanical properties, preferably, 1,4-butanediol is used as the dihydric alcohol and trimethylolpropane is used as the trihydric alcohol.

d. Non-Amine Catalyst

The thermosetting polyurethane used to form the protective layer 1 of the present invention is thermally cured in the presence of a non-amine catalyst. The thermosetting polyurethane of the present invention has excellent non-coloring properties, transparency, and weather resistance due to using a non-amine catalyst. On the other hand, in the thermosetting polyurethane that is thermally cured in the presence of an amine-based catalyst, emitted light turns yellow and an appearance becomes colored over time.

As the non-amine catalyst, for example, an organic tin compound such as di-n-butyl tin dilaurate, dimethyl tin dilaurate, dibutyltin oxide, and octane tin, an organic titanium compound, an organic zirconium compound, a carboxylic acid tin salt, and bismuth carboxylate, may be exemplified. Among them, an organic tin compound is preferable because a reaction rate is easily adjusted.

0.0005 weight % or more and 3.0 weight % or less of the non-amine catalyst is preferably added with respect to the total amount of the above a. to c. When the proportion is less than 0.0005 weight %, the reaction rate is not sufficiently high, and it is not possible to obtain a molded article with high efficiency in some cases. When the proportion is higher than 3.0 weight %, the reaction rate is too high, problems may occur, for example, it is not possible to obtain a molded article with a uniform thickness, heat resistance and weather resistance of the molded article deteriorate, light transmittance is lowered, and the molded article is colored. However, values beyond the above numerical value range are not excluded as long as they are within the spirit and scope of the present invention.

The thermosetting polyurethane used to form the protective layer 1 can contain various additives such as a coloring agent, a light stabilizer, a heat stabilizer, an antioxidant, an antifungal agent, a flame retardant, and a lubricant as necessary within a range in which required characteristics are not impaired.

The protective layer 1 is a molded article made of a thermosetting polyurethane obtained by curing a polyether polyol, an aliphatic isocyanate, and an alcohol-based curing agent in the presence of a non-amine catalyst. As a molding method thereof, any of a one shot method, a prepolymer method, and a quasi-prepolymer method may be used.

In the one shot method, a polyether polyol, an aliphatic isocyanate, an alcohol-based curing agent, optional additives, and a non-amine catalyst may be added together and cured to produce a thermosetting polyurethane molded article.

In the prepolymer method, a polyether polyol and a stoichiometrically excess amount of an aliphatic isocyanate are reacted to prepare a prepolymer having an isocyanate group at its end in advance, predetermined amounts of an alcohol-based curing agent, optional additives, and a non-amine catalyst are mixed thereinto, the prepolymer is cured and thereby a thermosetting polyurethane molded article may be produced.

In the quasi-prepolymer method, some of a polyether polyol is mixed with an alcohol-based curing agent in advance and the remaining polyether polyol and an aliphatic isocyanate are used to prepare a prepolymer, a mixture in which a polyether polyol, an alcohol-based curing agent, optional additives, and a non-amine catalyst are mixed together in advance is mixed thereinto and the mixture is cured, and thereby a thermosetting polyurethane molded article may be produced.

In a polyurethane component of the present invention, a ratio of the number of moles of hydroxyl groups (—OH) included in an alcohol-based curing agent to the number of moles of isocyanate groups (—NCO) of an aliphatic isocyanate or a prepolymer (—OH/—NCO: hereinafter referred to as an a ratio) is preferably 0.8 or more and 1.2 or less. When the ratio is less than 0.8, mechanical properties are unstable, and when the ratio is greater than 1.2, the surface stickiness increases and a favorable feeling of writing is impaired.

In addition, the thermosetting polyurethane preferably does not have an acrylic framework (an acrylic framework or a methacrylic framework). That is, the thermosetting polyurethane used to form the protective layer 1 of the present invention preferably does not contain an acrylic modified polyurethane. A thermosetting polyurethane having an acrylic framework can impair the flexibility of the polyurethane and lower the mechanical strength such as wear resistance and tear strength, and emitted light can be colored due to the acrylic framework or a residue from the catalyst that is used to introduce the acrylic framework.

The thickness of the protective layer 1 is preferably 100 μm or more and 300 μm or less. When the protective layer 1 has a thickness of 100 μm or more and 300 μm or less, a feeling of writing and sliding properties of a touch pen are very good, and a feeling of writing equivalent to that on paper is obtained, and an operation can be performed without feeling uncomfortable. When the thickness of the protective layer 1 is less than 100 μm, a feeling of writing and self-healing properties deteriorate, and when the thickness of the protective layer 1 is greater than 300 μm, light transmission properties, transparency, a feeling of writing, sliding properties, and self-healing properties deteriorate, and it is difficult to perform molding with a uniform thickness. When the thickness is 100 μm or more and 300 μm or less, the performance required for the surface protective film is exhibited in a well-balanced manner, and production is also easy. The thickness of the protective layer 1 is more preferably 130 μm or more and 270 μm or less, still more preferably 150 μm or more and 250 μm or less, and most preferably 180 μm or more and 220 μm or less.

The haze value of the surface protective film is 0.1% or more and 40% or less, and the total light transmittance is 90% or more. When the haze value is greater than 40% or the total light transmittance is less than 90%, the visibility of the display deteriorates. When the haze value of the surface protective film 10 is 0.1% or more and less than 3%, the transparency is excellent and a clear appearance can be obtained. When the haze value of the surface protective film 10 is 3% or more and 40% or less, it is possible to impart anti-glare properties to the surface protective film 10. In addition, with the surface protective film 10 having anti-glare properties, scratches on the surface of the protective layer 1 are less noticeable. In order to set the haze value of the surface protective film to be 3% or more and 40% or less, irregularities may be formed on the outermost surface of the protective layer 1. An irregular shape of the outermost surface of the protective layer 1 is not particularly limited as long as the above haze value and total light transmittance are obtained, and may be appropriately adjusted according to a refractive index, light absorbency, and the like of a material to be used, and in general, an average length (RSm) of a roughness curve element is about 10 μm or more and 80 μm or less. In addition, an arithmetic average roughness Ra is about 0.01 μm or more and 0.3 μm or less, and a maximum height Rz is about 0.1 μm or more and 2.0 μm or less.

"Transparent Substrate Film 2"

The transparent substrate film 2 holds the protective layer 1. A material constituting the transparent substrate film 2 can be used without particular limitation as long as it has excellent transparency, flexibility, and mechanical strength, and polyethylene terephthalate (PET), and a cyclic olefin resin (COP) can be suitably used.

The thickness of the transparent substrate film 2 is preferably 50 μm or more and 300 μm or less. The protective layer 1 of the surface protective film 10 of the present invention is made of a thermosetting polyurethane. A coefficient of thermal expansion of the thermosetting polyurethane used to form the protective layer 1 is generally higher than a coefficient of thermal expansion of a material constituting the transparent substrate film 2. Therefore, when the thickness of the transparent substrate film 2 is less than 50 μm, due to shrinkage of the protective layer 1 at low temperatures, inner stress is applied to an end of the transparent substrate film 2, and the surface protective film 10 can peel off from the transparent substrate 20. When the thickness of the transparent substrate film 2 is greater than 300 μm, the surface protective film 10 becomes bulky and costs increase. In addition, the operability during lamination on a touch panel type display surface deteriorates. Here, as will be described below in detail in "method of producing the protective layer 1," the protective layer 1 is directly molded on the transparent substrate film 2. In order to prevent deformation due to heat when the thermosetting polyurethane is thermally cured to form the protective layer 1, the transparent substrate film 2 is preferably thick. However, values beyond the above numerical value range are not excluded as long as they are within the spirit and scope of the present invention.

"Pressure-Sensitive Adhesive Layer 3"

Using the pressure-sensitive adhesive layer 3, the surface protective film 10 of the present invention is laminated on the transparent substrate 20 on the outermost surface of the display. The type of the pressure-sensitive adhesive is not particularly limited, and an acrylic resin, an epoxy resin, a urethane resin, and a silicone resin can be used. Among them, an acrylic resin can be attached to a surface substrate on which a surface treatment such as an antifouling treatment and a low reflection treatment is performed. In addition, a silicone resin has excellent wetting properties, causes less bubbles when it is attached to a transparent substrate, and has favorable removable properties and is unlikely to leave an adhesive residue when peeled off. The thickness of the pressure-sensitive adhesive layer 3 is generally within a range of 5 μm or more and 60 μm or less and can be appropriately adjusted according to required specifications.

Figure 3:
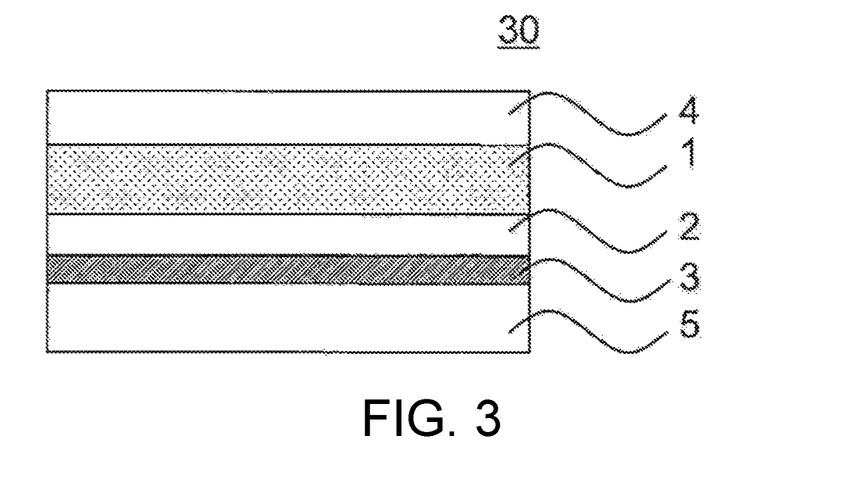
FIG. 3 is a diagram showing a surface protective film laminate.

In order to protect it from when it is produced until it is attached to the transparent substrate 20 and used, in the surface protective film 10 of the present invention, a mold release film 4 and a release film 5 are adhered to respective surfaces on the side of the protective layer 1 of the surface protective film 10 and the side of the pressure-sensitive adhesive layer 3, and thereby a surface protective film laminate 30 can be obtained. FIG. 3 shows the surface protective film laminate 30. Here, in FIG. 3, the thicknesses of the layers do not reflect actual thicknesses.

The mold release film 4 is provided to prevent contamination and adhesion of dust to the protective layer 1, and the like, and a film subjected to a mold release treatment on a surface on the side bonded to the protective layer 1 is preferably used. When the mold release film 4 on which a mold release treatment is performed is peeled off from the protective layer 1, a mold releasing agent is transferred from the mold release film 4 to the surface of the protective layer 1, sliding properties can be imparted to the surface of the protective layer 1 immediately after the mold release film is peeled off, and a touch operation can be performed without discomfort. In addition, as will be described below in detail in "method of producing the protective layer 1," the protective layer 1 can be directly molded on the mold release film 4. In this case, in order to prevent deformation due to heat when the thermosetting polyurethane is thermally cured to form the protective layer 1, the mold release film 4 thickness is preferably 50 µm or more and 300 µm or less and a thicker film is more preferable.

The release film 5 protects the pressure-sensitive adhesive layer 3, and prevents contamination, dust adhesion, and decrease in adhesive force, and a film subjected to a mold release treatment on a surface on the side bonded to the pressure-sensitive adhesive layer 3 can be suitably used.

"Method of Producing Protective Layer 1"

Figure 4:
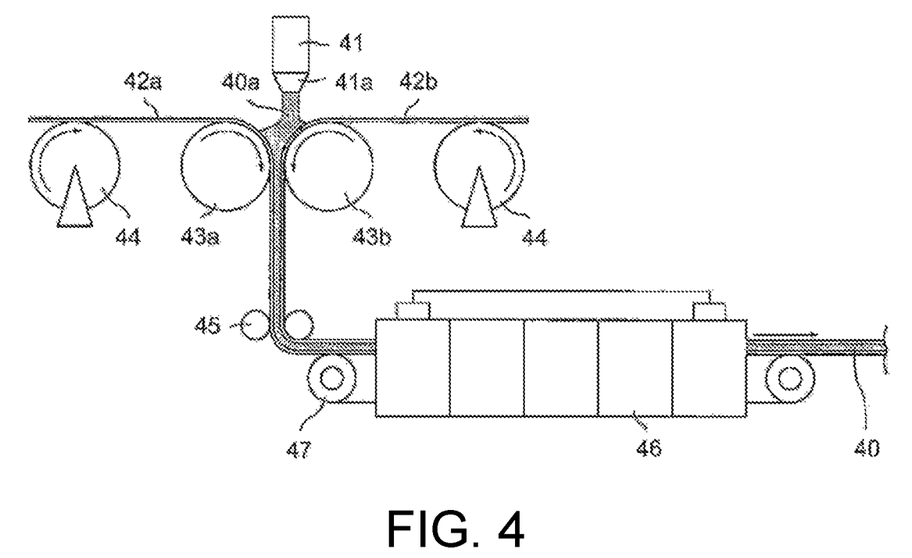
FIG. 4 is a diagram showing a method of producing a protective layer of a surface protective film.

The protective layer 1 is produced when a material component containing at least a polyether polyol, an aliphatic isocyanate (or a urethane prepolymer including them), an alcohol-based curing agent, optional additives, and a non-amine catalyst is sent to a gap between gap maintaining members that are conveyed by a pair of rollers which are disposed apart from each other, and while the material component that is held between the gap maintaining members is introduced into a heating device and thermally cured.

FIG. 4 shows a schematic diagram of a method of producing the protective layer 1. A method of producing the protective layer 1 will be described below with reference to FIG. 4.

A material component 40a containing at least a polyether polyol, an aliphatic isocyanate (or a urethane prepolymer including them), an alcohol-based curing agent, optional additives, and a non-amine catalyst is sent to a gap between first and second gap maintaining members 42a and 42b that are conveyed by a pair of transport rollers 43a and 43b which are disposed apart from each other using a casting machine 41. The first and second gap maintaining members 42a and 42b while holding the material component 40a therebetween are introduced into a heating device 46. The material component 40a that is held between the first and second gap maintaining members 42a and 42b is thermally cured and thereby a thermosetting polyurethane sheet-like article 40 is obtained.

Here, in FIG. 4, 44 indicates a transport roller for conveying the first and second gap maintaining members 42a and 42b, 45 indicates an auxiliary roller, and 47 indicates a conveyer belt through which the first and second gap maintaining members 42a and 42b that hold the material component 40a are transported into the heating device 46.

Since the first and second gap maintaining members 42a and 42b that hold the material component 40a therebetween are pulled at the same tension and transported, a gap therebetween can be maintained at a constant size. The material component 40a that is interposed between the first and second gap maintaining members 42a and 42b is cured while a constant thickness is maintained, and thereby the thermosetting polyurethane sheet-like article 40 having excellent thickness accuracy can be obtained. According to the producing method, it is possible to continuously mold the sheet-like article 40 having a thickness of 30 µm or more, which is not easily applied by coating, and has practical optical characteristics as a surface protective film of a display.

A position of a head part 41a of the casting machine 41 is preferably unevenly located on the side of one of heating rollers rather than at the center of the transport rollers 43a and 43b (the center of the gap formed by the first and second gap maintaining members 42a and 42b) and an unevenly distributed distance is preferably equal to or less than the radius of the transport roller. That is, a part directly below the head part 41a of the casting machine 41 is preferably positioned from the center of the pair of transport rollers 43a and 43b to the central axis of one transport roller. In addition, the shortest distance between a tip of the head part 41a and the surface of the transport roller is preferably 5 cm or less. When the head part 41a is provided in this manner, it is possible to further improve thickness accuracy of the thermosetting polyurethane sheet-like article 40, and bubbles are unlikely to enter the uncured material component 40a sent to the gap between the first and second gap maintaining members 42a and 42b, and entrained bubbles can easily escape.

The transport rollers 43a and 43b may simply have only a transport function, but are preferably heating rollers. When the transport rollers are heating rollers, the material component 40a can be cured immediately after it is held in the gap between the first and second gap maintaining members 42a and 42b, it is possible to maintain the thickness more uniformly until the material component 40a is introduced into the heating device 46, and it is possible to mold the thermosetting polyurethane sheet-like article 40 having superior thickness accuracy. When the transport roller is heated, a transport surface temperature is preferably set to 10° C. or higher and 60° C. or lower. When the temperature is lower than 10° C., the viscosity of the material component increases, bubbles cannot easily escape, a curing reaction occurs slowly, and the thickness accuracy of the sheet-like article 40 decreases. When the temperature exceeds 60° C., the material component 40a is cured on the transport roller and bubbles can enter the sheet-like article 40.

The heating device 46 is a heating furnace including a heater and may be any device that can increase the temperature in the furnace to a curing temperature of the material component 40a. In addition, heating conditions (curing conditions) in the heating device 46 are not particularly limited, and may be appropriately set according to a composition of the material component 40a. For example, conditions of 40° C. or higher and 160° C. or lower, and 1 minute or longer and 180 minutes or shorter may be set.

An elongated laminate in which the first gap maintaining member 42a, the thermosetting polyurethane sheet-like article 40, and the second gap maintaining member 42b are laminated in that order is discharged from the heating device 46. Then, the sheet-like article 40 becomes the protective layer 1 of the surface protective film 10 of the present invention and one of the first gap maintaining member 42a, and the second gap maintaining member 42b becomes the transparent substrate film 2 of the surface protective film 10 of the present invention. A case in which the first gap maintaining member 42a becomes the transparent substrate film 2 will be exemplified below.

The second gap maintaining member 42b can be used as the mold release film 4 of the surface protective film laminate 30 of the present invention. In this case, preferably, a film that is not subjected to a mold release treatment is used as the first gap maintaining member 42a which becomes the transparent substrate film 2 and a film that is subjected to a mold release treatment is used as the second gap maintaining member 42b which becomes the mold release film 4.

In addition, a film having irregularities can be used as the second gap maintaining member 42b, the material component 40a can be held on a surface having irregularities, and thereby irregularities can be transferred to the outermost surface of the sheet-like article 40 which becomes the protective layer 1.

The pressure-sensitive adhesive layer 3 is formed by coating on the surface of the first gap maintaining member 42a as the transparent substrate film 2 of the elongated laminate discharged from the heating device, the release film 5 is laminated on the pressure-sensitive adhesive layer 3, and thereby the elongated surface protective film laminate 30 of the present invention is obtained.

Here, the release film 5 can be laminated on the elongated transparent substrate film in advance with the pressure-sensitive adhesive layer 3 therebetween, a laminate in which the transparent substrate film 2, the pressure-sensitive adhesive layer 3, and the release film 5 are laminated in that order can be produced, and this laminate can be used as the first gap maintaining member 42a.

According to the present producing method, the surface protective film laminate 30 can be so-called roll to roll continuously produced. The produced surface protective film laminate 30 includes the mold release film 4 and the release film 5 on both surfaces, and can prevent scratches, contamination, and the like on the surface protective film 10, and has excellent handling properties. As long as it is shipped as the surface protective film laminate 30, the elongated surface protective film laminate 30 that is wound in a roll form can be shipped or the elongated surface protective film laminate 30 that is cut into a sheet form can be shipped. In addition, an elongated laminate including the first gap maintaining member 42a, the thermosetting polyurethane sheet-like article 40, and the second gap maintaining member 42b or the laminate that is cut can be shipped, and the pressure-sensitive adhesive layer 3 can be formed by coating in a display factory or the like, and can be laminated on a transparent substrate of the display.

EXAMPLES

The present invention will be described below in further detail with reference to examples, and the present invention is not limited to these examples.

Example 1

11.6 g of an alcohol-based curing agent having a weight ratio of 1,4-butanediol/trimethylolpropane=60/40, and 250 ppm of an organic tin compound as a non-amine catalyst were added to 100 g of a prepolymer (NCO %=10%) including polytetramethylene glycol as a polyol component and a hydrogenated diphenylmethane diisocyanate as an isocyanate component, and stirring and mixing were performed.

Then, a PET film with a thickness of 125 μm on which a silicone treatment was performed was used as the mold release film 4, a PET film with a thickness of 100 μm was used as the transparent substrate film 2, a silicone-based pressure-sensitive adhesive with a thickness of 50 μm was used as the pressure-sensitive adhesive layer 3, and a PET film with a thickness of 75 μm on which a silicone treatment was performed was used as the release film 5. According to the above molding method, a surface protective film laminate 1 having a protective layer with a thickness of 100 μm was obtained.

Example 2

In the same manner as in Example 1, a surface protective film laminate 2 having a protective layer with a thickness of 150 μm was obtained.

Example 3

In the same manner as in Example 1, a surface protective film laminate 3 having a protective layer with a thickness of 200 μm was obtained.

Example 4

In the same manner as in Example 1, a surface protective film laminate 4 having a protective layer with a thickness of 250 μm was obtained.

Example 5

A surface protective film laminate 5 having a protective layer with a thickness of 200 μm and having irregularities on the outermost surface was obtained in the same manner as in Example 1 except that an irregular transfer PET with a thickness of 100 μm, an Ra of 0.186 μm, an Rz of 1.541 μm, and an RSm of 35.61 μm on which a silicone treatment was performed was used as the mold release film 4.

Example 6

A surface protective film laminate 6 having a protective layer with a thickness of 200 vim and having irregularities on the outermost surface was obtained in the same manner as in Example 5 except that an irregular transfer PET with a thickness of 125 μm, an Ra of 0.081 μm, an Rz of 0.586 μm and an RSm of 20.336 μm on which a silicone treatment was performed was used as the mold release film 4.

Comparative Example 1

A surface protective film laminate 7 having a protective layer with a thickness of 250 vim was obtained in the same manner as in Example 4 except that 10.5 g of an alcohol-based curing agent having a weight ratio of 1,4-butanediol/trimethylolpropane=40/60 was used.

Comparative Example 2

A surface protective film laminate 8 having a protective layer with a thickness of 200 vim and having irregularities on the outermost surface was obtained in the same manner as in Example 5 except that an irregular transfer PET with a thickness of 100 μm, an Ra of 0.475 μm, an Rz of 2.48 μm, and an RSm of 34.687 μm on which a silicone treatment was performed was used as the mold release film 4.

"Load-Displacement Measurement"

In order to determine a lower limit of the thickness of the protective layer, the mold release film and the release film were peeled off from the surface protective film laminates 1 and 3 obtained in Examples 1 and 3, and protective layers with a thickness of 100 μm and 200 μm were then attached to a measurement table with a pressure-sensitive adhesive layer therebetween, and an amount of displacement when a load was applied at one point was measured.

In addition, with general copy paper (thickness: 0.09 mm, basis weight: 67 g/m2), one sheet of paper, two overlapping sheets of paper and five overlapping sheets of paper were prepared. In order to reduce a paper gap according to lamination, sheets of paper were pressed with an annular weight of 100 gf, and an amount of displacement when a load was applied to one point in the annular center was measured.

Measurement was performed by applying a load of 0 gf to 500 gf which is generally an upper limit of a writing pressure for a human to a cone with an angle of 85 degrees.

Figure 5:
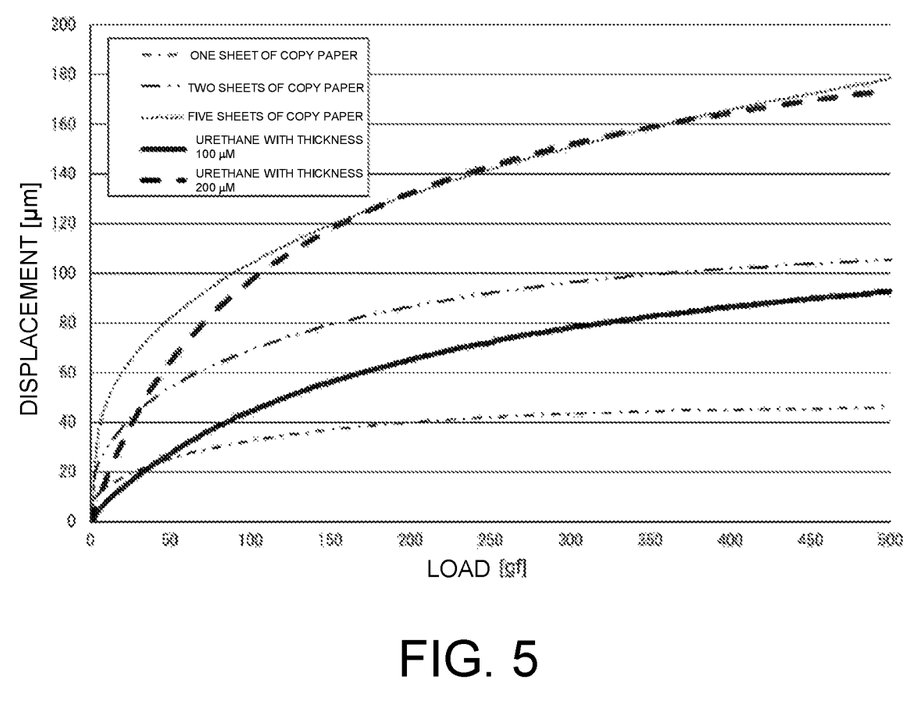
FIG. 5 is a graph showing a measured load-displacement.

FIG. 5 shows a graph showing a measured load-displacement.

It was confirmed that an amount of sinking displacement was a maximum of about 47 µm in one sheet of paper, a maximum of about 105 µm in two sheets of paper, and a maximum of about 179 µm in five sheets of paper. Therefore, it was confirmed that, in order to obtain a feeling as if writing were being performed on paper, an amount of sinking displacement exceeding 47 µm was necessary and particularly, in order to obtain a feeling as if writing were being performed on two or more overlapping sheets of paper, an amount of sinking displacement exceeding 105 µm was necessary.

It was found that the protective layer with a thickness of 100 µm had a maximum sinking of about 93 µm. It was confirmed that this amount of displacement sufficiently exceeded an amount of displacement of one sheet of paper and was close to that of two sheets of paper and is thought to be equivalent to that of 1.8 sheets of paper. In addition, it was found that the protective layer with a thickness of 200 µm had a maximum sinking of about 174 µm. The protective layer with a thickness of 200 µm had an amount of sinking displacement equivalent to that of five overlapping sheets of paper, and it was possible to obtain a feeling of writing equivalent to that on overlapping sheets of paper.

According to the above results, in particular, in order to obtain a feeling as if writing were being performed on two or more overlapping sheets of paper, it was necessary for a film thickness to sufficiently exceed an amount of displacement of one sheet of paper, and it was determined that the thickness of the protective layer was appropriately 100 µm or more.

The surface protective film laminates 1 to 8 obtained above were evaluated as follows. Evaluation results are shown in Table 1.

"Evaluation Method"

<International Rubber Hardness (IRHD)>

A 1 cm square sample was cut out from the prepared surface protective film laminate, and the mold release film and the release film were peeled off. Then the hardness on the side of the protective layer was measured using an IRHD rubber hardness tester (commercially available from Hildebrand).

<Sinking Depth>

The mold release film and the release film were peeled off from the prepared surface protective film laminates. Then, a metal plate having a convex shape with a width of 0.6 mm and a height of 0.7 mm was pressed against the side of the protective layer at a load of 350 g for 5 minutes.

One minute and 15 minutes after the metal plate was removed, a sinking depth of a recessed part was measured using a contact type surface roughness meter (device name: SV-3000 commercially available from Mitutoyo Corporation) under the following conditions. A feeling of writing was evaluated by the sinking depth after one minute and a greater sinking depth indicates a more favorable feeling of writing. Self-healing properties were evaluated by the sinking depth after 15 minutes and a smaller value indicates superior self-healing properties.

Measurement Conditions

Measurement length: 2.85 mm, speed: 0.05 mm/s, pitch: 0.2 µm

Evaluation Conditions

Standard: JIS 2001, evaluation curve type: PJ01, reference length: 0.25 mm, number of sections: 5, λs: 0.0025 mm, filter type: Gaussian, evaluation length: 1.25 mm, forward range: 0.8 mm, rearward range: 0.8 mm <Coefficient of Friction>

A 15 cm×5 cm sample was cut out from the prepared surface protective film laminates, and the mold release film and the release film were peeled off. Then, a coefficient of static friction, a coefficient of dynamic friction, and variation in the coefficient of dynamic friction were measured on the side of the protective layer under the following conditions. Surface property measuring instrument (device name: TYPE14 commercially available from Shinto Scientific Co., Ltd.)

Load: 153 g

Speed: 700 mm/min

Counter member: POM (tip shape with a radius curvature of 0.65 mm)

Angle: 75 degrees

Coefficient of static friction: peak value during measurement

Coefficient of dynamic friction: average value during a movement of 10 cm

Variation in coefficient of dynamic friction: difference between a maximum value and a minimum value of the coefficient of dynamic friction during a movement of 10 cm.

<Scratch Resistance>

A 10 cm square sample was cut out from the prepared surface protective film laminate, and the mold release film and the release film were peeled off. Then, a counter member was brought into contact with the side of the protective layer and it was visually observed whether there were scratches after 10,000 rotations under the following conditions. Here, a small amount of silicone spray (Silicone Spray 400, component: dimethyl silicone oil, commercially available from Ichinen Chemicals Co., Ltd.) was applied to the surface of the sample before the test and then the test was performed.

Counter member: POM (tip shape with a radius curvature of 0.65 mm)

Load: 500 g

Rotational speed: 20 rpm

Distance from center of rotation: 3 cm

<Total Light Transmittance, Haze>

A 5 cm square sample was cut out from the prepared surface protective film laminate, the mold release film and the release film were peeled off, the sample was set so that the surface of the protective layer was on the side of the light source, and a haze meter (device name: NDH-2000 commercially available from Nippon Denshoku Industries Co., Ltd.) was used for measurement.

<Surface Roughness>

Regarding the surface protective film laminates 5, 6, and 8 having irregularities on the outermost surface of the protective layer and the surface protective film laminate 3 having the protective layer with the same thickness, the surface shape of the surface of the protective layer from which the mold release film was peeled off was measured by the following method.

A 2 cm square sample was cut out from the prepared surface protective film laminate, the mold release film and the release film were peeled off, and an observation table of a laser microscope (device name: VK-9710 commercially available from Keyence Corporation) was set so that the protective layer was on the upper side. After focusing using an objective lens with a magnification of 50, measurement was performed according to Z measurement pitch: 0.02 μm, measurement mode: surface shape, measurement area: surface, measurement quality: high speed. Laser brightness adjustment was performed in an automatic adjustment mode.

Regarding images obtained by measurement using a laser microscope, a quadratic curved surface correction (automatic) mode was selected for gradient correction and image processing was performed. Then, a linear roughness measurement mode was selected, and measurement was performed three times at random in the image in a 2-point designation mode with a fixed length of 250 μm. Respective average values of the obtained measurement values (Ra, Rz, RSm) were calculated.

Example 1 in which the protective layer had a thickness of 100 μm had a greater sinking depth after 15 minutes than Example 2 in which the protective layer had a thickness of 150 μm. In addition, when the protective layer was thicker, all of a coefficient of static friction, a coefficient of dynamic friction, and a variation in the coefficient of dynamic friction were greater.

When the sinking depth after 1 minute was greater, a feeling of writing was superior. However, when a sinking depth after 15 minutes was greater, self-healing properties deteriorated. In addition, when the coefficient of friction was greater, sliding properties of the touch pen deteriorated. When the variation in the coefficient of dynamic friction was greater, the touch pen was likely to become stuck. The surface protective films of the present invention obtained in

TABLE 1

| | | Examples | | | | | | Comparative Examples | |
|---|---|---|---|---|---|---|---|---|---|
| | | 1 | 2 | 3 | 4 | 5 | 6 | 1 | 2 |
| Prepolymer | Polyol component | PTMG | PTMG | PTMG | PTMG | PTMG | PTMG | PTMG | PTMG |
| | Isocyanate component | HMDI | HMDI | HMDI | HMDI | HMDI | HMDI | HMDI | HMDI |
| Curing agent | 1,4BD | 60 | 60 | 60 | 60 | 60 | 60 | 40 | 60 |
| | TMP | 40 | 40 | 40 | 40 | 40 | 40 | 60 | 40 |
| Silicone addition | | No | No | No | No | No | No | No | No |
| Catalyst | | Organic tin compound | Organic tin compound | Organic tin compound | Organic tin compound | Organic tin compound | Organic tin compound | Organic tin compound | Organic tin compound |
| α ratio | | 1.05 | 1.05 | 1.05 | 1.05 | 1.05 | 1.05 | 0.95 | 1.05 |
| Urethane layer thickness | | 100 | 150 | 200 | 250 | 200 | 200 | 250 | 200 |
| Surface roughness Ra | | — | — | 0.031 | — | 0.183 | 0.063 | — | 0.382 |
| Rz | | — | — | 0.346 | — | 1.358 | 0.423 | — | 2.041 |
| RSm | | — | — | 66.48 | — | 43.49 | 23.09 | — | 30.68 |
| Total light transmittance (%) | | 91.2 | 91.1 | 91.2 | 91.0 | 91.3 | 91.5 | 91.0 | 91.1 |
| Haze (%) | | 0.92 | 0.95 | 0.98 | 1.00 | 30.39 | 4.50 | 0.95 | 60.84 |
| Hardness (IRHD) | | 94 | 91 | 90 | 88 | 90 | 90 | 93 | 93 |
| Sinking depth: after 1 min (μm) | | 1.78 | 2.14 | 3.07 | 3.52 | 3.00 | 2.52 | 1.60 | 2.95 |
| Self-healing properties: after 15 min (μm) | | 0.49 | 0.37 | 0.61 | 0.88 | 0.45 | 0.71 | 0.72 | 0.64 |
| Coefficient of static friction | | 0.28 | 0.29 | 0.30 | 0.36 | 0.30 | 0.32 | 0.27 | 0.31 |
| Coefficient of dynamic friction | | 0.22 | 0.22 | 0.21 | 0.33 | 0.21 | 0.25 | 0.18 | 0.23 |
| Variation in coefficient of dynamic friction | | 0.02 | 0.03 | 0.02 | 0.13 | 0.13 | 0.04 | 0.07 | 0.15 |
| Scratch resistance | | ◯ No scratch | ◯ No scratch | ◯ No scratch | ◯ No scratch | ◯ No scratch | ◯ No scratch | X With scratch | ◯ No scratch |

The surface protective films of the present invention obtained in Examples 1 to 4 had excellent performance such as smoothness, light transmission properties, transparency, and weather resistance as the surface protective film. In addition, the surface protective films of the present invention obtained in Examples 5 and 6 were excellent surface protective films having anti-glare properties additionally.

A surface protective film 7 obtained in Comparative Example 1 had insufficient strength with respect to the thermosetting polyurethane used and inferior scratch resistance. A surface protective film 8 obtained in Comparative Example 2 which had a haze value of 60% or more had low visibility although it had anti-glare properties.

According to Examples 1 to 4, when the protective layer was thicker, the sinking depth after 1 minute was greater. In addition, when the protective layer was thicker, the sinking depth after 15 minutes tended to be higher. However, Examples 1 to 4 had a favorable operability and feeling of use when the touch pen was used, and particularly Example 3 in which the protective layer had a thickness of 200 μm was excellent.

The invention claimed is:

1. A surface protective film in which three layers comprising a protective layer made of a thermosetting polyurethane which is a cured product of a polyether polyol, an aliphatic isocyanate, an alcohol-based curing agent, and a non-amine catalyst, a transparent substrate film, and a pressure-sensitive adhesive layer, are laminated in that order, and further comprising a mold release film,
wherein the protective layer is a single layer and has a thickness of 100 μm or more and 300 μm or less, the pressure-sensitive adhesive layer is a silicone adhesive, and a ratio of a number of moles of hydroxyl groups included in the alcohol-based curing agent to a number of moles of isocyanate groups of the aliphatic isocyanate or a prepolymer is 1.05 or more and 1.2 or less, wherein, the mold release film is adhered to a surface on the side of the protective layer of the surface protective film, the mold release film is a PET film with a thickness of 125 μm on which a silicon treatment was performed, an irregular transfer PET with a thickness of 100 μm, an Ra of 0.186 μm, an Rz of 1.541 μm, and an RSm of 35.61 μm on which a silicon treatment was performed, or an irregular transfer PET with a thickness of 125 μm, an Ra of 0.081 μm, an Rz of 0.586 μm and an RSm of 20.336 μm on which a silicon treatment was performed, wherein a haze value of the surface protective film is 0.1% or more and 40% or less.

2. The surface protective film according to claim 1, wherein the alcohol-based curing agent is a mixture of 50 parts by weight or more and 100 parts by weight or less of a dihydric alcohol and 50 parts by weight or less and 0 parts by weight or more of a trihydric alcohol.

3. A surface protective film laminate in which a release film is laminated on a surface on the side of the pressure-sensitive adhesive layer of the surface protective film according to claim 1.

4. A method of producing a surface protective film comprising: laminating three layers comprising a protective layer made of a thermosetting polyurethane obtained by curing a polyether polyol, an aliphatic isocyanate, and an alcohol-based curing agent in the presence of a non-amine catalyst, a transparent substrate film, and a pressure-sensitive adhesive layer in that order; sending a material component containing a polyether polyol, an aliphatic isocyanate, an alcohol-based curing agent, and a non-amine catalyst to a gap between first and second gap maintaining members that are conveyed by a pair of rollers which are disposed apart from each other; thermally curing the material component that is held between the first and second gap maintaining members to form the protective layer; and forming one of the first and second gap maintaining members as the transparent substrate film, wherein the protective layer is a single layer and has a thickness of 100 μm or more and 300 μm or less, the pressure-sensitive adhesive layer is a silicone adhesive, and a ratio of a number of moles of hydroxyl groups included in the alcohol-based curing agent to a number of moles of isocyanate groups of the aliphatic isocyanate or a prepolymer is 1.05 or more and 1.2 or less, a mold release film is adhered to surfaces on the side of the protective layer of the surface protective film, the mold release film is a PET film with a thickness of 125 μm on which a silicon treatment was performed, an irregular transfer PET with a thickness of 100 μm, an Ra of 0.186 μm, an Rz of 1.541 μm, and an RSm of 35.61 μm on which a silicon treatment was performed, or an irregular transfer PET with a thickness of 125 μm, an Ra of 0.081 μm, an Rz of 0.586 μm and an RSm of 20.336 μm on which a silicon treatment was performed, wherein a haze value of the surface protective film is 0.1% or more and 40% or less.

5. The method of producing a surface protective film according to claim 4, wherein one of the first and second gap maintaining members is a film that is not subjected to a mold release treatment and the other is a film that is subjected to a mold release treatment.

6. The method of producing a surface protective film according to claim 5, wherein the other of the first and second gap maintaining members is a film having irregularities and the material component is held on a surface having the irregularities.

\* \* \* \* \*